United States Patent [19]

Knight

[11] 3,799,262

[45] Mar. 26, 1974

[54] METHOD FOR REDUCING THE FLOW OF WATER THROUGH PERMEABLE EARTH STRATA

[75] Inventor: Robert K. Knight, Fullerton, Calif.

[73] Assignee: Union Oil Company of California, Los Angeles, Calif.

[22] Filed: Nov. 16, 1972

[21] Appl. No.: 306,985

[52] U.S. Cl.................. 166/270, 166/294, 166/274
[51] Int. Cl...................... E21b 33/138, E21b 43/22
[58] Field of Search ........... 166/270, 275, 274, 294, 166/292, 305 R; 252/8.55 D

[56] References Cited
UNITED STATES PATENTS

| | | | |
|---|---|---|---|
| 3,082,823 | 3/1963 | Hower | 166/294 |
| 3,241,612 | 3/1966 | Hiller | 166/294 X |
| 3,378,070 | 4/1968 | Wessler et al. | 166/294 X |
| 3,611,733 | 10/1971 | Eilers et al. | 166/294 X |

*Primary Examiner*—Stephen J. Novosad
*Attorney, Agent, or Firm*—Richard C. Hartman; Dean Sandford

[57] ABSTRACT

A method for reducing the flow of water through permeable earth strata in which the earth strata is contacted with an aqueous solution containing hydroxyethyl cellulose and a water-soluble substituted poly(hydroxyalkyl) bis(triazinylamino)stilbene. The method can be used to reduce the flow of water through particular strata in communication with a water injection well and to treat producing wells to reduce producing water/oil ratios.

14 Claims, No Drawings

METHOD FOR REDUCING THE FLOW OF WATER THROUGH PERMEABLE EARTH STRATA

This invention relates to the treatment of oil-bearing earth formations, and more particularly to a method for reducing the flow of water through a permeable earth formation.

It is well known to those skilled in the art that the production of large amounts of water from oil and/or gas wells constitutes one of the major items of expense in the operation of these wells. Many oil wells will produce a gross effluent comprising 80 to 90 percent by volume, or more, of water and only 10 to 20 percent by volume, or less, of oil. Most of the pumping energy is therefore expended in lifting water from the well, and thereafter the effluent must be put through expensive separation procedures to recover water-free oil, and the separated foul water constitutes a troublesome and expensive disposal problem. It is known that water flowing through permeable earth strata reduces the flow of oil through those strata. Also, water production rates often increase to the extent that they exceed the capacity of the downhole pumping equipment, thus allowing a column of liquid to stand in the well which increases the back-pressure on the formation. These phenomena tend to decrease the oil production capability of the well.

Many techniques for reducing water production from oil and gas wells have been described, among the most successful being treatment of the well with an aqueous solution of a high molecular weight, water-soluble, partially hydrolyzed polyacrylamide. However, not all wells respond to this treatment and it is desirable to find a more efficient and lower cost method for reducing the producing water/oil ratio in a producing well.

In another aspect, the nonuniform flow of water through an oil-bearing reservoir is often a problem encountered in conducting a waterflooding program to increase oil recovery. Typically, permeabilities and porosities through an oil-bearing reservoir vary greatly with depth. A ten-fold or even a hundred-fold variation in permeability is not uncommon. When flood water or other displacing medium is injected into such a reservoir through an injection well, the highly permeable zones or streaks have a natural tendency to accept substantially the entire volume of injected flood water, to the substantial exclusion of the less permeable zones. This uneven flow pattern, if uncorrected, is a great detriment to the waterflooding operation and can lead to its complete failure.

Thus, need exists for a method for reducing the flow of water through earth strata, and particularly for reducing the flow of water through oil-bearing strata.

Accordingly, it is a principal object of the present invention to provide a method for reducing the flow of water through a permeable earth formation.

Another object of the invention is to provide a method for reducing the flow of water through an oil-bearing permeable earth formation.

Still another object of the invention is to provide a method for increasing the production of oil and gas, and reducing the expense of operating oil and gas wells.

A further object of the invention is to provide a method for reducing the producing water/oil ratio of an oil well.

A still further object of the invention is to provide a method for improving the water injection profile of a water injection well.

An even further object of the invention is to provide a method for selectively reducing the permeability of the more permeable strata of a heterogeneous formation penetrated by a water injection well whereby the water injectivity of the formation is rendered more uniform.

Other objects and advantages of the invention will be apparent from the following description.

Briefly, this invention contemplates a method for reducing the water permeability of a permeable earth formation in which the formation is contacted with an aqueous solution containing hydroxyethyl cellulose and a substituted poly(hydroxyalkyl) bis(triazinylamino)-stilbene. This method can be used to reduce the flow of water through particular strata in communication with a water injection well and to treat producing gas and oil wells to improve the producing water/oil ratios.

The hydroxyethyl cellulose employed in the treating solution is a relatively high molecular weight, water-soluble, nonionic polymeric cellulose ether derived from cellulose. The cellulose molecule consists of a chain of repeating anhydroglucose units. Hydroxyethyl cellulose can be prepared by treating cellulose with caustic and then reacting the caustic treated cellulose with about 1 to 3 moles of ethylene oxide for each anhydroglucose unit in the cellulose molecule. The viscosity of an aqueous solution of hydroxyethyl cellulose depends in the concentration and molecular weight of the hydroxyethyl cellulose. Broadly, the hydroxyethyl cellulose employed in the practice of this invention has about 1 to 3 moles of substituent ethylene oxide per anhydroglucose unit and is characterized by a Brookfield viscosity of about 1,500 to 5,000 centipoises at 25° C. for a 1 weight percent solution thereof in water. A preferred hydroxyethyl cellulose ethylene has about 2.5 moles of substituent ethylene oxide per anhydroglucose unit and is characterized by a viscosity of about 3,400 to 5,000 centipoises at 25° C. for a 1 weight percent solution. A suitable hydroxyethyl cellulose for use in the method of this invention is marketed by Hercules Incorporated under the trademark Natrosol 250 HHR hydroxyethyl cellulose.

The substituted poly(hydroxyalkyl) bis(triazinylamino)stilbenes, hereinafter referred to as PBTS, employed in the treating solutions used in the practice of this invention are organic compounds represented by the following generalized formula

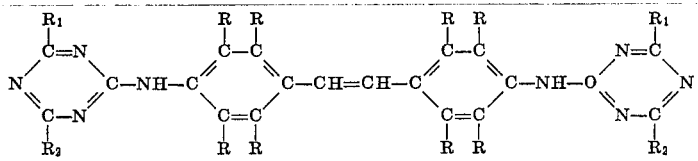

wherein R represents the same or differnt members of the group consisting of (1) hydrogen, (2) alkyl radicals containing up to four carbon atoms, exemplary of which are methyl, ethyl, propyl and butyl radicals, (3) sulfo radicals and the metal and ammonium salts thereof such as sodium, potassium, lithium and ammonium sulfonates, and (4) hydroxyl radicals; $R_1$ represents the same or different members of the group consisting of (1) hydroxy-substituted alkyl amino or aryl amino radicals, and (2) hydroxy-substituted alkyloxy or aryloxy radicals exemplary of which are hydroxyethyl amino, hydroxy-substituted anilino, $\beta$-hydroxy ethyloxy, $p$-hydroxy propyloxy and $p$-hydroxy phenoxy radicals; and $R_2$ represents the same or different members of the group consisting of (1) hydroxy- or sulfo- substituted alkyl amino or aryl amino radicals, and (2) hydroxy- or sulfo- substituted alkyloxy or aryloxy radicals exemplary of which are hydroxyethyl amino, 3-hydroxy anilino, 3-sulfoanilino, $\beta$-hydroxyethyloxy, $p$-hydroxy propyloxy, and $p$-hydroxy phenoxy radicals.

A preferred substituted poly(hydroxyalkyl) bis(triazinyl-amino)stilbene is 4,4'-bis(4-(3-sulfoanilino)-6-((bis-2-hydroxy-ethyl)-amino)-1,3,5-triazin-2-ylamino)stilbene-2,2'-disulfonic acid tetrasodium salt. It is known that this material will cross-link or gel hydroxyethyl cellulose in aqueous solution, however the superiority of these systems in reducing the flow of water through permeable earth strata has not heretofore been recognized.

The above-described PBTS can be prepared by nitrating stilbene with nitric acid and then sulfonating the reaction product with sulfuric acid and neutralizing with sodium hydroxide to obtain the sodium salt of the dinitrostilbene disulfonate. Melamine is separately reacted with sodium 3-sulfoaniline and this product reacted with the dinitrostilbene sodium disulfonate. The resulting product is then ethoxylated with ethylene oxide to yield the bis(2-hydroxyethyl)amino derivative.

The treating solutions employed in the practice of this invention are prepared by dissolving or dispersing hydroxyethyl cellulose and PBTS in an aqueous solvent such as water or brine. The gel forming tendency of the system is more pronounced at higher salt contents, resulting in higher viscosity solutions in brine for equal concentrations of the additives. The hydroxyethyl cellulose can be employed at a concentration of 0.01 to 1 weight percent, and preferably at a concentration of 0.05 to 0.5 weight percent, and the PBTS is employed in the proportion of about 0.01 to 0.5 parts by weight per part of hydroxyethyl cellulose, and more preferably in the proportion of about 0.05 to 0.3 parts per part of hydroxyethyl cellulose.

The treating method of this invention can be employed in the treatment of both water injection wells and producing oil and gas wells. In the case of the treatment of water injection wells, the treating solution is injected through the injection well and into the reservoir and followed by the injection of flood water. The treating solution preferentially enters the more permeable strata and, hence, tends to effect a larger reduction in permeability in these strata than in the less permeable strata.

In the treatment of producing oil and gas wells, production is interrupted and the treating solution injected through the well and into the reservoir. Preferably, the treating agent solution is followed by injection of sufficient water to displace the treatagent solution from the well into the formation. The treating agent solution preferentially enters the water-bearing strata, tending to form a gelatinous material therein that effects a reduction in permeability of these strata, thereby reducing the flow of water into the well without effecting any substantial reduction in the flow of oil and/or gas into the well. Thus, water production rates are decreased without decreasing oil production rates and, in fact, oil production rates are in many cases increased substantially.

In the treatment of both water injection wells and producing oil and gas wells, it is desired that the formation surrounding the well be contacted with the treating solution to a distance of from about 1 to 100 feet from the well, and more preferably to a distance of about 10 to 50 feet. In most instances, the desired contacting can be obtained by injecting into the formation about 0.1 to 1000 barrels of treating solution per foot of vertical thickness of formation to be treated, and more preferably from about 1 to 50 barrels per foot of formation, the larger volumes of treating solution being sometimes required to obtain permeability reduction in certain high permeability streaks.

In a preferred mode of practicing the invention to treat either water injection or producing oil and gas wells, approximately 1 to 50 barrels of treating solution per foot of vertical thickness of formation to be treated is injected through the well and into the formation, the treating agent solution being an aqueous solution or dispersion containing approximately 0.05 to 0.5 weight percent of a hydroxyethyl cellulose having about 2.5 moles of ethylene oxide substitution per anhydroglucose unit and which is characterized by a viscosity of 3,400 to 5,000 centipoises at 25° C. for a 1 percent solution thereof and about 0.05 to 0.3 parts of 4,4'-bis(4-(3-sulfoanilino)-6-((bis-2-hydroxyethyl)-amino)-1,3,5-triazin-2-ylamino)stilbene-2,2'-disulfonic acid tetrasodium salt per part of hydroxyethyl cellulose. Preferably, this solution contains at least about 2 weight percent of dissolved alkali metal salts, such as sodium chloride and the like.

While particular embodiments of the invention have been described, it will be understood, of course, that the invention is not limited thereto since many modifications can be made and it is intended to include within the invention such modifications as are within the scope of the claims.

EXAMPLE 1

This example demonstrates the effect of substituted poly-(hydroxyalkyl) bis(triazinylamino)stilbene upon the viscosity of hydroxyethyl cellulose solutions.

A first series of three solutions is prepared by dissolving in deionized water 0.1 weight percent of a hydroxyethyl cellulose marketed by Hercules Incorporated under the trademark Natrosol 250 HHR. To one of these solutions is added 0.01 weight percent of 4,4'-bis(4-(3-sulfoanilino)-6-((bis-2-hydroxyethyl)-amino)-1,3,5-triazin-2-ylamino)stilbene-2,2-disulfonic acid tetrasodium salt, and to a second of the solutions is added 0.02 weight percent of this additive.

A second series of two solutions is prepared by dissolving 0.1 weight percent of the hydroxyethyl cellulose in an aqueous sodium chloride solution containing 2.3 weight percent sodium chloride. To one of these solutions is added 0.02 weight percent of the substituted PBTS additive.

A third series of these solutions is prepared by dissolving 0.1 weight percent of the hydroxyethyl cellulose in an aqueous sodium chloride solution containing 12.6 weight percent sodium chloride. To one of these solutions is added 0.01 weight percent of the substituted PBTS additive, and to a second of the solutions is added 0.02 weight percent of the additive.

Viscosities are determined for all of the solutions at 75° F. using a Brookfield viscometer equipped with a UL adapter and operated at various spindle speeds. These data are reported in Table 1. These data show that small concentrations of the substituted poly(hydroxyalkyl) bis(triazinylamino)stilbene are effective in increasing the viscosity of aqueous hydroxyethyl cellulose solutions, and are most effective in increasing the viscosity of these solutions containing high concentrations of dissolved salts.

TABLE 1

VISCOSITIES OF AQUEOUS HYDROXYETHYL CELLULOSE SOLUTIONS

| Solvent | Conc. of PBTS, Wt.% | Brookfield Viscosity, cp at 75° F. | | |
|---|---|---|---|---|
| | | 3 rpm | 6 rpm | 12 rpm |
| Deionized Water | 0 | 4.6 | 4.5 | 4.4 |
| Do. | 0.01 | 4.6 | 4.8 | 4.8 |
| Do. | 0.02 | 6.6 | 6.1 | 5.9 |
| 2.3 wt.% NaCl solution | 0 | 5.0 | 4.7 | 4.5 |
| Do. | 0.02 | 9.6 | 7.8 | 7.4 |
| 12.6 wt.% NaCl solution | 0 | 4.6 | 5.0 | 5.6 |
| Do. | 0.01 | 6.4 | 6.6 | 6.6 |
| Do. | 0.02 | 10.6 | 9.2 | 8.3 |

EXAMPLE 2

This example illustrates the water shutoff obtainable with the method of this invention. Two models of a producing well that produces oil from one strata and water from another strata are constructed. These models are cylinders 1-inch in diameter, 4-inches long packed with Nevada 130 sand and each model has an oil inlet at one end, a water inlet at the opposite end, and a center outlet connection. An oil having a viscosity of 12 centipoises at 75° F. is flowed through the oil inlet and an aqueous salt solution containing 12.6 weight percent sodium chloride is flowed through the water inlet until equilibrium is established. The effluent discharged through the center outlet is collected and the oil and water flow rates determined.

One of the models is treated by injecting 1 pore volume of an aqueous salt solution containing 12.6 weight percent of sodium chloride and 0.1 weight percent of hydroxyethyl cellulose marketed by Hercules Incorporated under the trademark Natrosol 250 HHR through the outlet connection. Oil and brine flow is then resumed. Oil and water flow rates are measured and the equilibrium flows established.

This treatment is repeated on the second model using as a treating agent the same hydroxyethyl cellulose solution to which is added 0.02 weight percent of the substituted poly(hydroxyalkyl) bis(triazinylamino)stilbene employed in Example 1.

The viscosities of the treating solutions are reported in Table 2 and the equilibrium flow rates both before and after treatment are reported in Table 3.

TABLE 2

VISCOSITIES OF TREATING SOLUTIONS

| | Brookfield Viscosity, cp at 75° F. | | |
|---|---|---|---|
| | 3 rpm | 6 rpm | 12 rpm |
| 0.1 Wt.% HEC solution | 5.6 | 5.0 | 4.6 |
| 0.1 Wt.% HEC solution plus 0.02 Wt.% PBTS additive | 10.6 | 9.2 | 8.3 |

TABLE 3

RESULTS OF OIL AND WATER FLOW TESTS

| Model No. | Test | Flow Rates, ml/hr | | Water/Oil Ratio |
|---|---|---|---|---|
| | | Oil | Water | |
| 1 | Before treatment | 30 | 183 | 6.1 |
| | After treatment with HEC solution | 21 | 175 | 8.3 |
| 2 | Before treatment | 35 | 260 | 7.4 |
| | After treatment with HEC solution containing additive | 60 | 5 | 0.8 |

EXAMPLE 3

This example illustrates the treatment of an oil well producing a high water/oil ratio by the method of this invention. The well is completed in oil-bearing strata approximately 12 feet thick. The water cut has increased to above about 95 percent, making further production from the well uneconomical.

The well is treated by injecting 480 barrels of a treating solution prepared by admixing 0.15 weight percent of hydroxyethyl cellulose having 2.5 moles of ethylene oxide substitution per unit of anhydroglucose and which is characterized by a Brookfield viscosity of 1,500 to 2,500 centipoises at 25° C. for a 1 percent solution thereof and 0.015 weight percent of the PBTS employed in Example 1. The solution is injected into the well and followed by the injection of sufficient water to displace the treating solution from the well, and the well is returned to production.

EXAMPLE 4

This example illustrates the treatment of a water injection well by the method of this invention to preferentially reduce the flow of water into the permeable strata. A treated oil-field brine is employed as the injection water and is injected into the well at a rate of about 600 barrels per day. The well is open to about 120 feet of reservoir, however, well tests establish that about 90 percent of the injected water is entering permeable strata about 10 feet in thickness.

The well is treated by interrupting the injection of flood water and injecting 500 barrels of an aqueous treating solution prepared by dissolving or dispersing about 0.1 weight percent hydroxyethyl cellulose having 2.5 moles of ethylene oxide substitution per unit of anhydroglucose and which is characterized by a Brookfield viscosity of 3,400 to 5,000 centipoises at 25° C. for a 1 percent solution thereof and 0.02 weight percent PBTS in the oil-feed brine. Waterflooding is resumed at approximately the same water injection rate.

While particular embodiments of the invention have been described, it will be understood, of course, that the invention is not limited thereto since many modifications can be made and it is intended to include within the invention such modifications as are within the scope of the claims.

Having now described the invention, I claim:

1. A method for reducing the flow of water through a permeable earth formation, which comprises contacting said formation with an aqueous solution or dispersion containing 0.01 to 1 weight percent of hydroxyethyl cellulose and 0.01 to 0.5 parts by weight of a substituted poly(hydroxyalkyl) bis(triazinylamino)stilbene per part of said hydroxyethyl cellulose.

2. The method defined in claim 1 wherein said permeable earth formation is penetrated by a water injection well and said aqueous solution is injected through said well and into the formation, and thereafter flood water is injected.

3. The method defined in claim 1 wherein said permeable earth formation is a petroleum reservoir penetrated by a producing oil and/or gas well and said aqueous solution is injected through said well and into the formation, and thereafter fluids are recovered from said well.

4. The method defined in claim 3 wherein water is injected after said aqueous solution to displace said aqueous solution from the well into the formation.

5. The method defined in claim 1 wherein said aqueous solution is injected into said formation in an amount equivalent to about 0.1 to 100 barrels of said solution per foot of vertical thickness of formation to be treated.

6. The method defined in claim 1 wherein said aqueous solution also contains at least about 2 weight percent of water-soluble alkali metal salts.

7. The method defined in claim 1 wherein said substituted poly(hydroxyalkyl) bis(triazinylamino)stilbene is characterized by the following generalized formula:

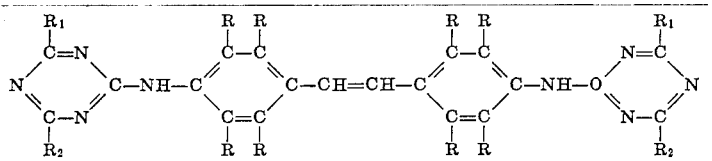

wherein R represents the same or different members of the group consisting of (1) hydrogen, (2) alkyl radicals containing up to 4 carbon atoms, (3) sulfo radicals and the metal and ammonium salts thereof, and (4) hydroxy radicals; $R_1$ represents the same or different members of the group consisting of (1) hydroxy-substituted alkyl amino or aryl amino radicals, and (2) hydroxy-substituted alkyloxy or aryloxy radicals; and $R_2$ represents the same or different members of the group consisting of (1) hydroxy- or sulfo- substituted alkyl amino or aryl amino radicals and the metal and ammonium salts thereof, and (2) hydroxy- or sulfo-substituted alkyloxy or aryloxy radicals and the metal and ammonium salts thereof.

8. A method for treating a water injection well penetrating a permeable earth formation to reduce the flow of water from the well into the more permeable strata of said formation, which comprises:

injecting through said well and into the formation about 1 to 1,000 barrels of an aqueous treating solution per foot of vertical thickness of formation to be treated, said solution containing (1) about 0.05 to 0.5 weight percent of a hydroxyethyl cellulose having about 1 to 3 moles of ethylene oxide substitution per anhydroglucose unit of the cellulose and which is characterized by a Brookfield viscosity of 1,500 to 5,000 centipoises at 75° F. for a 1 weight percent solution thereof in water, and (2) about 0.05 to 0.3 parts by weight of a substituted poly(hydroxyalkyl) bis(triazinylamino)stilbene per part of hydroxyethyl cellulose, said substituted poly(hydroxyalkyl) bis(triazinylamino)stilbene being characterized by the following generalized formula

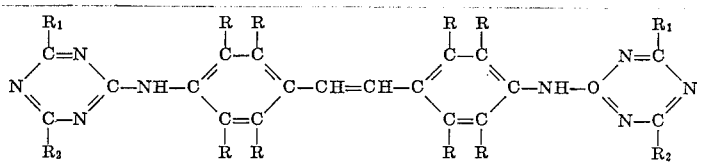

wherein R represents the same or different members of the group consisting of (1) hydrogen, (2) alkyl radicals containing up to four carbon atoms, (3) sulfo radicals and the metal and ammonium salts thereof, and (4) hydroxy radicals; $R_1$ represents the same or different members of the group consisting of (1) hydroxy-substituted alkyl amino or aryl amino radicals, and (2) hydroxy-substituted alkyloxy or aryloxy radicals; and $R_2$ represents the same or different members of the group consisting of (1) hydroxy- or sulfo- substituted alkyl amino or aryl amino radicals and the metal and ammonium salts thereof, and (2) hydroxy- or sulfo-substituted alkyloxy or aryloxy radicals and the metal and ammonium salts thereof; and injecting flood water through said well and into the formation.

9. The method defined in claim 8 wherein said substituted poly(hydroxyalkyl) bis(triazinylamino)stilbene is a 4,4'-bis(4-(3-sulfoanilino)-6-((bis-2-hydroxyethyl)-amino)-1,3,5-triazin-2-ylamino)-stilbene-2,2'-disulfonic acid tetrasodium salt.

10. The method defined in claim 8 wherein said aqueous solution also contains at least about 2 weight percent of water-soluble alkali metal salts.

11. A method for treating a petroleum-bearing formation penetrated by a well to reduce the flow of water from the formation into the well, which comprises:

injecting through said well and into the formation about 1 to 1,000 barrels of an aqueous treating solution per foot of vertical thickness of formation to be treated, said solution containing (1) about 0.05 to 0.5 weight percent of a hydroxyethyl cellulose having about 1 to 3 moles of ethylene oxide substitution per anhydroglucose unit of the cellulose and which is characterized by a Brookfield viscosity of 1,500 to 5,000 centipoises at 75° F. for a 1 weight percent solution thereto in water, and (2) about 0.05 to 0.3 parts by weight of a substituted poly(hydroxy-alkyl) bis(triazinylamino)stilbene per part of hydroxy-ethyl cellulose, said substituted poly(hydroxyalkyl) bis(triazinylamino)stilbene being characterized by the following generalized formula

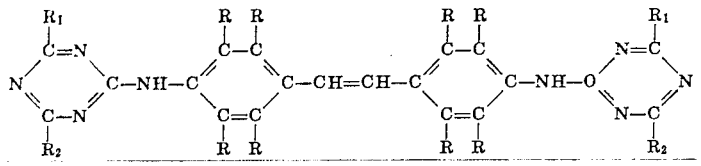

wherein R represents the same or different members of the group consisting of (1) hydrogen, (2) alkyl radicals containing up to four carbon atoms, (3) sulfo radicals and the metal and ammonium salts thereof, and (4) hydroxy radicals; $R_1$ represents the same or different members of the group consisting of (1) hydroxy-substituted alkyl amino or aryl amino radicals, and (2) hydroxy-substituted alkyloxy or aryloxy radicals; and $R_2$ represents the same different members of the group consisting of (1) hydroxy- or sulfo- substituted alkyl amino or aryl amino radicals and the metal and ammonium salts thereof, and (2) hydroxy- or sulfo- substituted alkyloxy or aryloxy radicals and the metal and ammonium salts thereof producing floods from the well.

12. The method defined in claim 11 wherein water is injected after said aqueous solution to displace said solution from the well into the formation.

13. The method defined in claim 11 wherein said substituted poly(hydroxyalkyl) bis(triazinylamino)stilbene is 4,4'-bis(4-(3-sulfoanilino)-6-((bis-2-hydroxyethyl)-amino)-1,3,5-triazin-2-ylamino)stilbene-2,2'-disulfonic acid tetrasodium salt.

14. The method defined in claim 11 wherein said aqueous solution also contains at least about 2 weight percent of water-soluble alkali metal salts.

* * * * *

UNITED STATES PATENT OFFICE
CERTIFICATE OF CORRECTION

Patent No. 3,799,262                Dated March 26, 1974

Inventor(s) Robert K. Knight

It is certified that error appears in the above-identified patent and that said Letters Patent are hereby corrected as shown below:

In column 2 of the Specification and in Claims 7, 8 and 11 - the "O" in the C-NH-C connecting bond should be C rather than an O in the last ring.

Signed and sealed this 10th day of September 1974.

(SEAL)
Attest:

McCOY M. GIBSON, JR.              C. MARSHALL DANN
Attesting Officer                  Commissioner of Patents